Aug. 1, 1944.  J. H. CHURCH ET AL  2,354,665

METHOD FOR PROTECTING AGAINST ATTACKING AIRCRAFT

Filed June 22, 1942

Inventors
Joseph H. Church
Edward A. Ruestow

Attorneys

Patented Aug. 1, 1944

2,354,665

UNITED STATES PATENT OFFICE 2,354,665

METHOD FOR PROTECTING AGAINST ATTACKING AIRCRAFT

Joseph H. Church, United States Army, Austin, Minn., and Edward A. Ruestow, United States Army, Cleveland, Ohio Application June 22, 1942, Serial No. 447,970

2 Claims. (Cl. 240—49)

(Granted under the act of March 3, 1883, as amended April 30, 1928; 370 O. G. 757)

The invention described herein may be manufactured and used by or for the Government for governmental purposes, without the payment to us of any royalty thereon.

Our invention relates to a method for protecting cities, factory areas, ships, or any objective of military importance against the bombing attacks of military aircraft. More specifically it relates to a lighting method which will tend to blind and confuse the aircraft pilots and thereby effectively conceal the protected areas from them.

In the past it has been the practice to guard against night air attacks by completely blacking out the area to be protected so that hostile aircraft would be unable to observe their objectives. The efficacy of this method is somewhat nullified by the fact that the objective may be illuminated by flares dropped by the hostile aircraft or by fires ignited by their incendiary bombs. In the method which we propose, not only is no attempt made to black out but in contrast thereto, the air space above the area is brilliantly illuminated for the purpose of creating a dazzling glare which will tend to confuse and blind the pilots of the hostile aircraft and thereby effectively conceal their objective from them. The effect may be increased by causing the light to fluctuate in intensity and in complex spacial patterns. The fact that the eyes of the hostile pilots are accustomed to darkness of the surrounding regions would further accentuate the blinding effect on their eyes. The method would have the further advantage that the hostile aircraft would be illuminated to facilitate observation by defending ground forces.

Generally speaking the objects of our invention are accomplished by providing a series of rapidly rotating search lights positioned at a short distance above the area to be protected. The beams of such lights are caused to rotate in a generally horizontal plane whereby the effect of a continuous curtain of light covering the entire 360° traverse of the search light may be produced. The confusing effect produced by such lights can be further increased by the interposition of mirrors at suitable points in the path of the rotating beam whereby additional confusing beams projecting upward from the generally horizontal curtain may be produced. By properly choosing the frequency of rotation it will also be possible to produce certain stroboscopic patterns which will further enhance the confusing effect.

Figure 1:
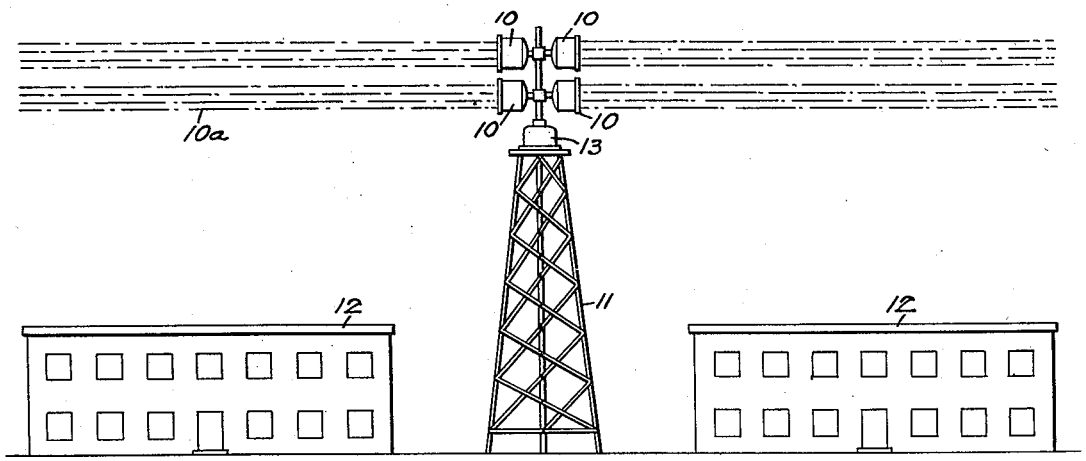
Figure 2:
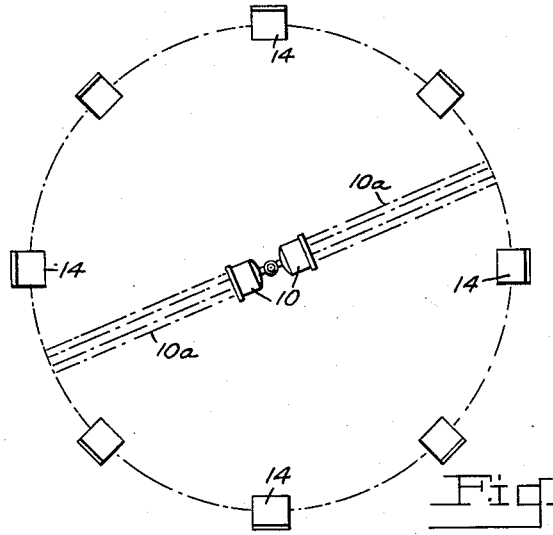
Figure 3:
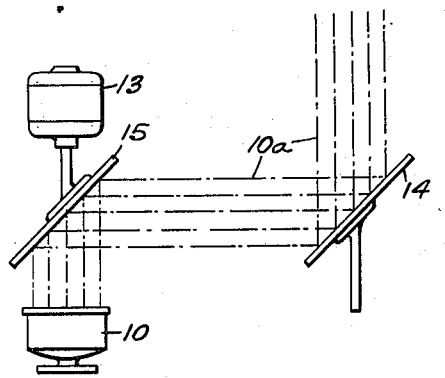
Figure 4:
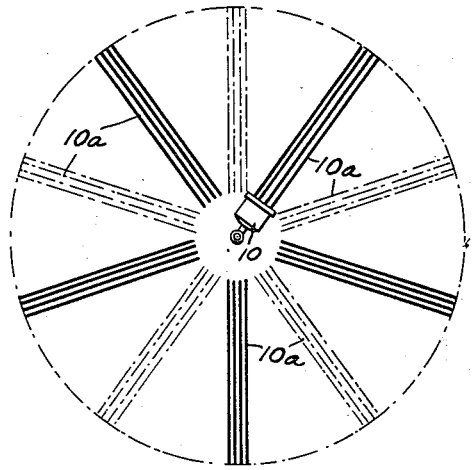

For a more detailed consideration of our invention, reference is made to the following specification and to the accompanying drawing in which Fig. 1 shows a side elevational view of an area, such as an industrial area, protected in accordance with our invention while Fig. 2 is a plan view of Fig. 1 as seen from above. Fig. 3 shows a modified arrangement for the search lights while Fig. 4 is another plan view illustrating diagrammatically the use of the stroboscopic effect.

Referring to Fig. 1 the search lights 10 are mounted on suitable supporting towers 11 at a convenient distance above the factories 12 or other military objectives designed to be protected from attacking aircraft. The search lights may be rotated by any suitable power means such as electrical motor 13 in such a manner that the beam 10a from the light rotates in a generally horizontal plane. The search lights will be rotated at an angular velocity in excess of about fifteen revolutions per second. As is well known the human eye is unable to detect continuous cyclic motion below this frequency because of the so-called persistence of vision phenomenon. The effect of this is, of course, that the eye would not be able to detect the individual search light beam at any given point of its path and therefore the search light structure would appear to be at the center of a continuous circular curtain of light. It will be obvious that if the light intensity of the beams 10a is great enough, hostile pilots approaching the protected area from above will be unable to see through the curtain of light produced by the one or many search lights.

It will be understood, of course, that the rotation need not be confined to a horizontal plane in every case. For example, the direction of the beam may be inclined to the horizontal in which case the appearance of a cone of light would be produced. This might have the advantage that the light is more apt to be directed directly into the eyes of the hostile pilots. Moreover, an additional advantage could be obtained by causing the search light to oscillate in a plane through its axis of rotation (a vertical plane in most cases) at the same time that it is rotating in a horizontal plane. In this case the horizontal circular curtain of light in Fig. 1 would be broadened in its vertical dimension to form a solid cone of light.

One or more lights may be mounted on the same rotating shaft as desired. Moreover, the various lights may be advantageously mounted on towers of different height whereby a plurality of curtain of lights in planes of different altitude may be obtained. The search lights themselves may be of any of the conventional high powered types. For example, they may be of the carbon arc type or of the recently developed mercury vapor lamp type employing capillary mercury tubes in which an electric arc is caused to pass through mercury vapor maintained at pressures of many atmospheres.

If desired, the lights may be provided with a series of peripherally disposed reflectors such as mirrors 14 (see Figs. 2 and 3) arranged to intercept the rotating beam at various points along its path and to project it in a generally vertical direction. This added arrangement will provide a number of vertical columns of light which appear to project from the curtain of light already described. These columns will, of course, add to the confusing effect. These mirrors 14 may be fixed or they may be rotated. In the latter case they may be rotated slowly enough so that they send only an occasional shaft of light in the upward direction.

Fig. 3 shows a modification of the search light mounting arrangement in which the search light may be at rest. This may be of an advantage where large lights with heavy masses are used. In this arrangement the search light is fixed with its output beam directed upward toward a rotating reflector such as mirror 15 driven by the motor 13. The mirror in this case will, of course, create the 360° screen of light as before.

Referring now to Fig. 4, there is shown here a plan view of the search light pattern as seen by the observer from above. As it is well known in the art of lighting, the light intensity from an alternating current lamp varies through the alternating current cycle for the obvious reason that the current strength alternates between a maximum value and zero during the complete cycle. If then the search light of our method is caused to rotate at a frequency equal to frequency of the supply current, or a harmonic or subharmonic thereof, it will be apparent that the instants of maximum and minimum light intensity may be made to occur at the same point of the 360° traverse. In this case a circular stroboscopic pattern having alternate bright and relatively dark sectors as indicated by the light and heavy lines will be produced. By causing the frequency of rotation to differ slightly from the frequency of the supply current, or the harmonic or subharmonic thereof, this stroboscopic pattern can be caused to rotate in one direction or the other in the manner well known in the art of stroboscopes. It will be obvious that such rotating stroboscopic patterns will further confuse the hostile pilots and that this effect can be still further enhanced by causing the stroboscopic patterns in the individual lights to rotate at different frequencies and in different directions. This can, of course, be accomplished by rotating the search lights themselves at different angular velocities. The use of different frequencies in this manner will have the added advantage that it will render it impossible for the hostile pilots to use stroboscopic devices of the same frequency as the lights for seeing through the rotating pattern.

Our method may also be used for the protection of ships from either aircraft or submarine attacks. In this case, the lights are mounted on the uppermost parts of the ships. By causing the search light beam to rotate in a generally oblique plane (oblique to the surface of the water) a curtain of light half of which is projected on the water and half of which is projected into the air, is produced. By providing several of these oblique curtains of light, complete coverage of the ship can be obtained.

Many other uses for the method will be apparent. For example, if all the military objectives in a given vicinity are protected with this method it would be possible to confuse the hostile attackers by erecting lighting systems of the nature of our invention in open fields in the surrounding countryside. The attackers would then be unable to determine which set of lights covered their true objective. They might thereby be induced to jettison their bomb loads in the open fields where they could do no harm.

It will be obvious that many modifications in the method may be produced by different combinations of lamps or by different arrangements for mounting and rotating them. For example, it might be possible to employ lights of different color and thereby still further increase the confusing effect. Further, fluorescent lamps might be used to produce variation in the color throughout the stroboscopic patterns inasmuch as it is known that in such lamps the various color components reach a maximum intensity at different times during the alternating current cycle. The maximum intensities for the various color components would therefore occur in different sectors of patterns shown in Fig. 4. All such modifications mentioned herein, we aim to cover within the scope of the appended claims.

What we claim is:

1. The method of concealing an object from an observer by creating between said object and observer a stroboscopic light screen having alternate sections of different light intensity which comprises, producing a light beam whose intensity varies in cycles of selected frequency, rotating said light beam in a plane intersecting the line of vision between said object and observer at a frequency approximately equal to a harmonic or subharmonic of the selected frequency and sufficiently high to maintain persistence of vision.

2. The method of concealing an object from an observer by creating between said object and observer a stroboscopic light screen having alternate sections of different light intensity which comprises, producing a light beam whose intensity and color varies in cycles of selected frequency, rotating said light beam in a plane intersecting the line of vision between said object and observer at a frequency approximately equal to a harmonic or sub-harmonic of the selected frequency and sufficiently high to maintain persistence of vision.

JOSEPH H. CHURCH.
EDWARD A. RUESTOW.